United States Patent [19]

Oho et al.

[11] Patent Number: 4,604,620
[45] Date of Patent: Aug. 5, 1986

[54] INFORMATION TRANSMISSION SYSTEM

[75] Inventors: Shigeru Oho, Hitachi; Takeshi Hirayama, Mito, both of Japan

[73] Assignee: Hitachi, Ltd., Tokyo, Japan

[21] Appl. No.: 464,212

[22] Filed: Feb. 7, 1983

[30] Foreign Application Priority Data

Feb. 8, 1982 [JP] Japan .................................. 57-17535

[51] Int. Cl.⁴ .............................................. H04Q 1/00
[52] U.S. Cl. ........................... 340/825.52; 340/825.07
[58] Field of Search ........................... 307/9, 10 R, 12; 340/825.52, 825.21, 825.07, 825.06; 179/18 FC; 370/92, 94

[56] References Cited

U.S. PATENT DOCUMENTS

| 3,345,624 | 10/1967 | Brown | 340/825.52 X |
| 3,541,257 | 11/1970 | McCormick et al. | 340/825.52 |
| 3,648,057 | 3/1982 | Sognefest et al. | 307/10 R |
| 3,921,139 | 11/1975 | Hardesty, Jr. et al. | 340/825.52 |
| 3,986,169 | 10/1976 | Kobayashi et al. | 340/825.52 |
| 4,085,403 | 4/1978 | Meier et al. | 307/10 R X |
| 4,127,845 | 11/1978 | Dansbach et al. | 340/825.06 X |
| 4,131,882 | 12/1978 | Hollabaugh et al. | 340/825.06 X |
| 4,156,866 | 5/1979 | Miller | 340/825.52 X |
| 4,418,333 | 11/1983 | Schwarzbach et al. | 340/825.07 X |

FOREIGN PATENT DOCUMENTS 2435579  2/1975  Fed. Rep. of Germany ........................ 340/825.52
2121223 12/1983  United Kingdom ................... 370/92

OTHER PUBLICATIONS

SAE Paper No. 810174 entitled "Multiplexing—Application and Installation", by Paul M. Goyke (National Semiconductor).

Primary Examiner—Ulysses Weldon
Attorney, Agent, or Firm—Antonelli, Terry & Wands

[57] ABSTRACT

A terminal device for outputting control signals and receiving sensor outputs is equipped with address setting terminals for setting an address of the terminal device. The address information at the address setting terminals is supplied to a decoder which decodes an input/output function or mode setting signal. Input-/output functions of input/output terminals are set by the address information by controlling output buffer circuits which transmit the signals of the input/output terminals, in accordance with the decoded input/output function setting signal. The address setting terminals are shared by the address terminals and the input/output function setting terminals to that the number of terminals can be reduced.

19 Claims, 7 Drawing Figures

INFORMATION TRANSMISSION SYSTEM

The present invention relates to an information transmission system.

A modern automobile is equipped with a number of various electric devices such as lamps and motors and various sensors. As a result, wiring to transmit control signals to the electric devices or signals sensed by the sensors is complex. In order to simplify the wiring, several proposals have been made to transmit and receive the signal by a multiple transmission technique.

For example, the SAE paper 810174 reports one example of such a simplified wiring. In the proposed system, terminal processors are directly connected to the electric devices and the sensors, and they send the control signals to the electric devices and receive the sensed signals from the sensors. In the proposed system, the terminal processor for sending the control signals is separate from the terminal processor for receiving the switch information.

In the information transmission system, however, it is desirable that a terminal device have both the ability to send information to the electric devices and the ability to receive signals from the sensors. This is true especially for an automobile information transmission system.

In an information transmission system, the types of inputs received by the terminal device and the types of outputs vary depending on the purpose of operation of the terminal device. When the information transmission system is equipped in an automobile, the number of input terminals and output terminals greatly varies depending on the location in the automobile at which the terminal device is mounted. For example, a large number of input terminals are required around the driver seat because it is necessary to read in switch signals as operation information for a driver. On the other hand, a large number of output terminals for sending the control signals to the electric devices are required near the rear trunk.

In the past, it has not been intended to fabricate the terminal device by an I.C device, but where the terminal device is incorporated in a mass-produced machine such as the automobile, it is necessary to implement the terminal device in the form of an I.C device. When such an IC terminal device is used, the number of input terminals and output terminals varies depending on the purpose of usage and the location where it is installed, as described above. As a result, the number of input and output terminals may be more or less than necessary and hence the number of terminal devices required may increase.

It is an object of the present invention to provide a terminal device capable of setting a desired number of input terminals and output terminals.

In accordance with the present invention, a selection circuit for setting input/output terminals as input terminals and output terminals is provided in the terminal device. Thus, an appropriate number of input terminals and an appropriate number of output terminals can be set depending on the purpose of use and the location of use of the terminal device. As a result, the total number of terminal devices required in the information transmission system can be reduced and the construction of the information transmission system can be simplified.

The above and other objects and features of the present invention will be apparent from the following detailed description of the invention taken in conjunction with the accompanying drawings, in which:

The present invention will now be described in detail with reference to preferred embodiments thereof.

Figure 1:
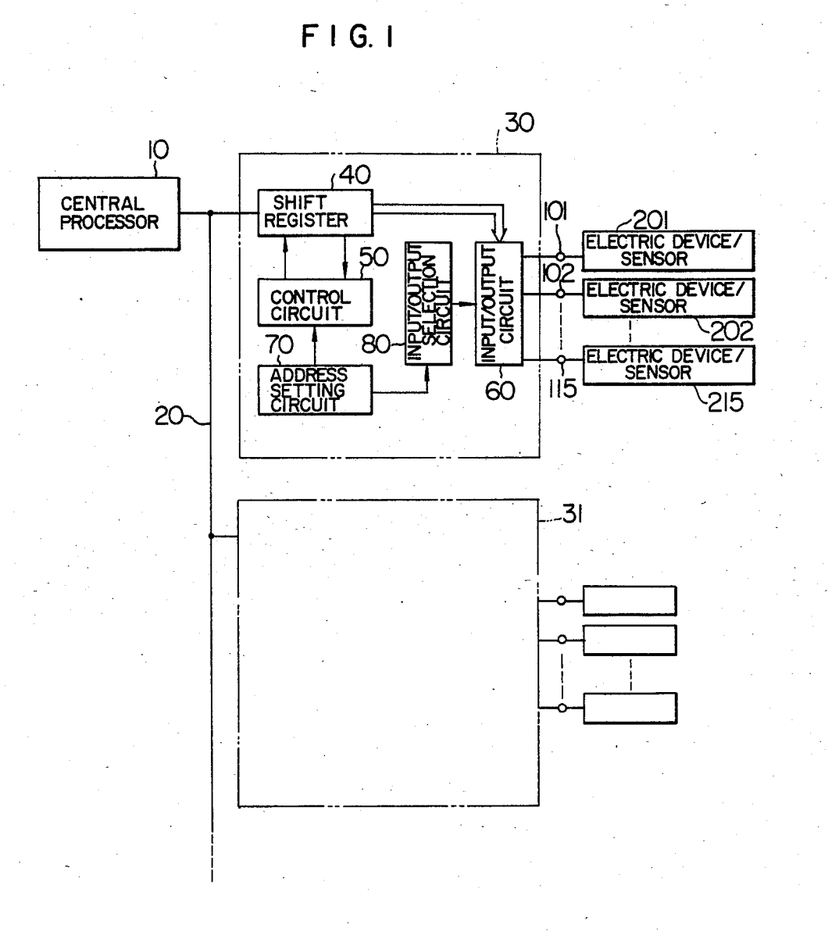
FIG. 1 shows a block diagram of an information transmission system of the present invention.

FIG. 1 shows an embodiment of an information transmission system with terminal devices in accordance with the present invention. A central processor 10 and terminal devices 30 and 31 are interconnected via a transmission line 20 to exchange information therebetween. Each of the terminal devices 30 and 31 has a shift register 40 for sending and receiving signals, a control circuit 50 for managing an operation of the terminal device, an input/output circuit 60 for holding control data to be sent to various electric devices and detection data received from detection devices such as sensors, and an input/output selection circuit 80 for selecting the input/output functions or modes of the input/output terminals. The electric devices and the sensors 201, 202, . . . 215 are connected to the input/output circuit 60 through the input/output terminals 101, 102, . . . 115. Each of the terminal devices 30 and 31 is provided with an address setting circuit 70 for setting an address which is inherent to the corresponding terminal device. The address assigned to the terminal device is added to a signal transmitted over the transmission line 20 so that the data is transmitted between the central processor 10 and the specified terminal device.

Figure 2:
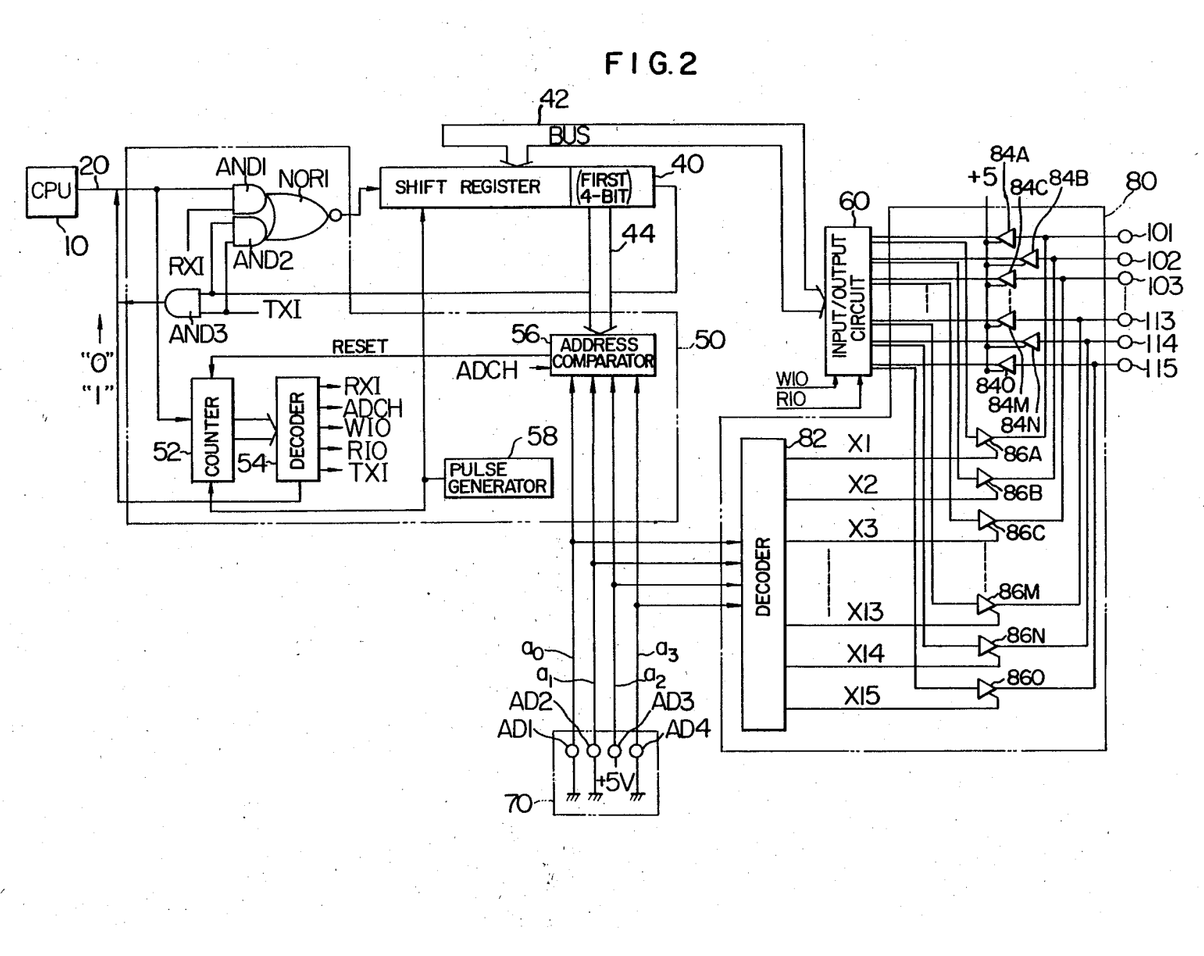
FIG. 2 shows a block diagram of a terminal device.
Figure 3:
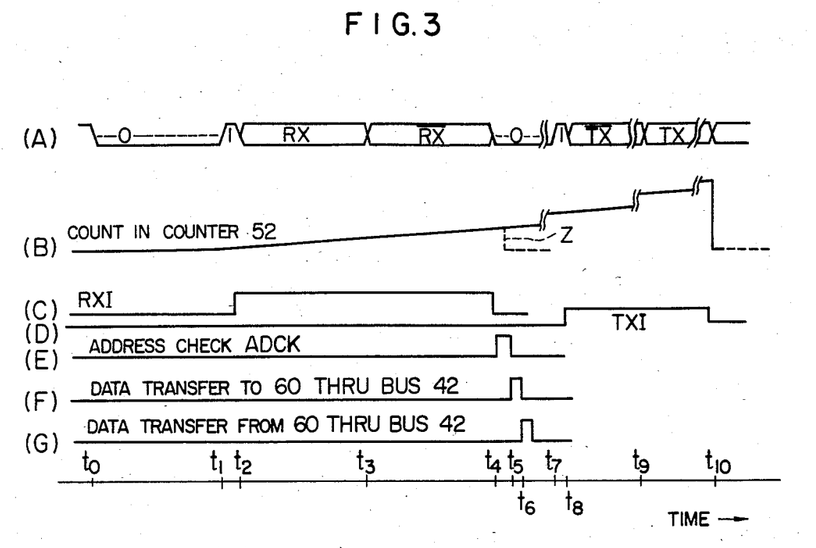
FIG. 3 shows a time chart for an operation of the terminal device of FIG. 2.

FIG. 2 shows a detailed circuit diagram of the terminal device 30 or 31, and FIG. 3 shows a time chart for an operation thereof. A "0" signal is first transmitted from the central processor 10 to the transmission line 20 as shown in (A) of FIG. 3 and it lasts for a time period $t_0-t_1$. The "0" signal is supplied to a counter 52 and a start of transmission status is assumed on the condition that the "0" signal lasts for a predetermined time period. When a "1" signal is transmitted from the central processor 10 at time $t_1$, the counter 52 starts to count. The counter 52 counts clock pulses of a constant frequency generated from a pulse generator 58. The count of the counter 52 is supplied to a decoder 54 which produces a signal RXI at time $t_2$. Thus, an AND gate AND1 is conditioned. Data RX is transmitted from the central processor 10 during a time period $t_2-t_3$. The first four bits of the data RX include an address for specifying the corresponding terminal device. Thus, the present information transmission system may include up to sixteen terminal devices. The data RX is supplied to a shift register 40, one bit at a time in synchronism with the clock pulses from the pulse generator 58, through the AND gate AND1 and a NOR gate NOR1. Since the data RX sent from the transmission line 20 through the AND gate AND1 is inverted by the NOR gate NOR1, the inverted data $\overline{RX}$ is set in the shift register 40 at time $t_3$. The inverted signal $\overline{RX}$ of the data RX transmitted during the time period $t_2-t_3$ is subsequently transmitted from the central processor 10, one bit at a time in synchronism with the clock pulses from the pulse generator 58. The data is inverted, one bit at a time, through the AND gate AND1 and the NOR gate NOR1 and it is supplied to the shift register 40. As a result, the data RX held in the shift register 40 is shifted out, one bit at a time, and the shift register 40 holds the data RX at time $t_4$.

Since the count of the counter 52 is supplied to the decoder 54, the signal RXI from the decoder 54 terminates at the time $t_4$ and the AND gate AND1 is disabled. The shifting of the shift register 40 is also stopped.

A "0" signal from the decoder 54 is transmitted to the central processor 10 through the transmission line 20 for a predetermined period of time, that is, until time $t_7$.

The address setting circuit 70 has four terminals AD1-AD4. The number of terminals is determined by the number of terminal devices. When four terminals are included as in the illustrated embodiment, up to sixteen terminal devices can be specified. In the illustrated embodiment, the terminals AD1, AD2 and AD4 are grounded and the terminal AD3 is connected to a power supply. Accordingly, they represent an address "0100". This address is supplied to an address comparator 56. On the other hand, the first four bits of the data RX or $\overline{RX}$ transmitted from the central processor represent the address data. This address data is supplied to the address comparator 56 from the shift register 40 through a bus 44. Between time points $t_4$ and $t_5$, a signal ADCH from the decoder 54 is supplied to the address comparator 56, which checks if the address data from the bus 44 and the address in the address setting circuit 70 are equal. If they are not equal, that is, when the decision is such that the corresponding terminal device is not selected, a reset signal is sent to the counter 52 from the address comparator 56. When the reset signal is supplied, the counter 52 is reset to its initial state as shown by a dotted line Z in (B) of FIG. 3, and the decoder 54 which generates an output control signal based on the count of the counter 52 is also reset to its initial state. If the address comparator 56 detects that the address data from the bus 44 and the address in the address setting circuit 70 are equal, the counter 52 is not reset. Thus, the counter 52 is further advanced, and the decoder generates a signal WIO at time $t_5$ to enable the input/output circuit 60. As a result, the decoder 54 sets the data of the shift register 40 into the input/output circuit 60 through the bus 42 at time $t_5$. The input/output circuit 60 has flip-flops for storing at least as many bits as the number of input terminals.

Each of the terminal devices 30 and 31 has a function for setting the input/output terminals 101, 102, . . . 115 as input terminals and/or output terminals. This function is attained by the input/output selection circuit 80. Only those bits of the data applied from shift register 40 to the input/output circuit 60 which correspond to the terminals selected as output terminals by the input/output selection circuit 80 are sent to the output terminals. The input/output selection circuit 80 comprises a decoder 82, output buffers 86A-86O and input buffers 84A-84O. The address data bits $a_0$-$a_3$ of the address setting circuit 70 are supplied to the decoder 82. Thus, as many high level signals as the digital number corresponding to the address data $a_0$-$a_3$ are sequentially produced. In the present embodiment, the address signal is "0100". Accordingly, four signals X1-X4 assume the high level. These signals are supplied to the buffers 86A-86D and the first four bits of the input/output circuit 60 are supplied to the terminals 101-104. As a result, the terminals 101-104 function as output terminals and the other terminals serve as input terminals. The buffers 86A-86O are constructed by three-state circuits and arranged between the output terminals of the flip-flops of the input/output circuits and the input/output terminals 101-115, respectively. On the other hand, the input buffers 86A-84O are also constructed by three-state circuits and are arranged between the input terminals of the flip-flops of the input/output circuits and the input/output terminals 101-115, respectively. In the present embodiment, since high level signals are always applied to the control terminals, all of the three-state circuits 84A-84O are always enabled.

When the data of the shift register 40 is set the flip-flops of the input/output circuit 60 through the bus 42 at time $t_5$, the first four bits, in the present embodiment, are supplied to the terminals 101-104 through the three-state circuits 86A-86D. The applied signals are not altered unless the data in the input/output circuit 60 is altered. Since the input buffers 84A-84O are always active, the states at the terminals 101-115 are supplied to the flip-flops of the input/output circuit 60. The states at the terminals 101-104 selected as the output terminals are also supplied to the corresponding flip-flops of the input/output circuit 60. The signals outputted through the buffers 86A-86D are fed back to those terminals through the input buffers 84A-84D but they do not impede the operation. If an error or failure occurs in the input/output selection circuit 80 or the input/output terminals and the circuits connected thereto, a signal which is different from that outputted from the input/output circuit 60 through the output buffer is supplied to the input/output circuit and the data held in the flip-flops of the input/output circuit is changed to a signal different from the output signal. Accordingly, by checking the content of the input/output buffer, the error or failure in the circuit can be detected.

After the signal shown in (F) of FIG. 3, a signal RIO shown in (G) of FIG. 3 is produced from the decoder 54 at time $t_6$. In response thereto, the information at the terminals 101-115 which is the data held in the input/output circuit 60 is set into the shift register 40 through the bus 42. As the "0" output from the decoder 54 lasts for a predetermined time period, the count of the counter 52 reaches a predetermined count at time $t_7$ and the output of the decoder 54 to the transmission line 20 changes to "1". The "0" and "1" signals are sent to the central processor 10 through the transmission line 20 and the central processor 10 prepares for the reception of the data from the terminal device. A signal TXI shown in (D) of FIG. 3 is outputted from the decoder 54 at time $t_8$ and the AND gates AND3 and AND2 are conditioned and the shift register 40 starts shifting in response to the clock pulses from the pulse generator 58. The data in the shift register 40 is sent to the transmission line 20 through the AND gate AND3. The output from the shift register 40 is also fed back to the shift register 40, through the AND gate AND2 and the NOR gate NOR1. Since the NOR gate NOR1 has an inverting function, the data held in the shift register 40 is inverted and the inverted data is set in the shift register 40 again. The transmission of the data TX held in the shift register 40 is started at time $t_8$ and it is terminated at time $t_9$. Then, the data $\overline{TX}$ (inversion of the data TX) is subsequently outputted from the shift register 40 and the data $\overline{TX}$ is transmitted during a time period $t_9$-$t_{10}$. At time $t_{10}$, the transmission of the data from the terminal device is terminated and the count of the counter 52 is reset to its initial state as shown in (B) of FIG. 3.

Figure 4:
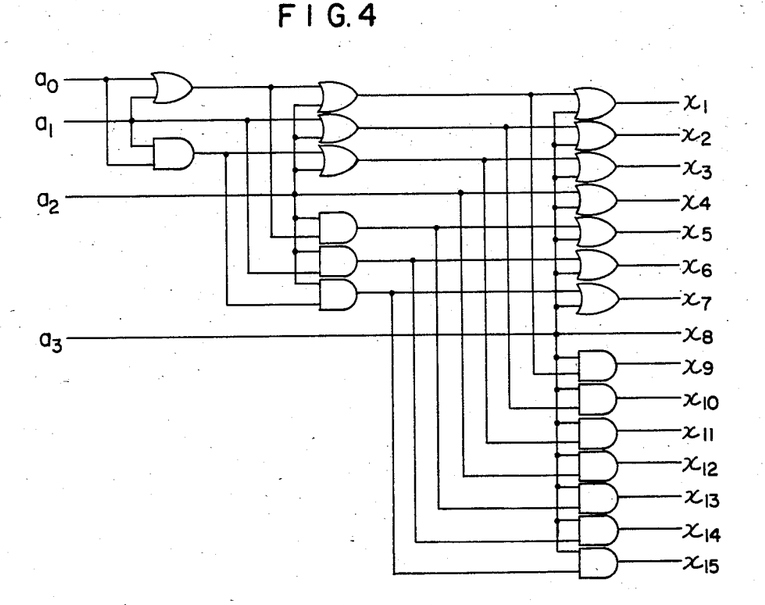
FIG. 4 shows a detailed circuit diagram of a decoder.

FIG. 4 shows an embodiment of the decoder 82 of the input/output selection circuit which receives the address data and produces the input/output control signals as described above, each of the terminal devices is assigned with the four-bit address, as represented by logical signals $a_0$, $a_1$, $a_2$ and $a_3$. The decoder 82 produces input/output signals $x_1$, $x_2$, ... $x_{15}$ such that the input/output selection circuit 80 sets as many input/output terminals as the digital number represented by the binary address as the output terminals and sets the other terminals as input terminals. For example, when the address is "0100" ($a_3$="0", $a_2$="1", $a_1$="0", $a_0$="0"), it corresponds to "4" in decimal notation and hence the four input/output control signals $x_1$, $x_2$, $x_3$ and $x_4$ are of high level while all others are of low level. Accordingly, four of the fifteen input/output terminals 101–115 are set as the output terminals and the remaining eleven input/output terminals are set as the input terminals. Since the output terminals correspond to those sequentially arranged input/output terminals which have the address assigned to the terminal device, it is convenient to arrange the terminal device in the automobile and connect the signal lines of the electric devices and the sensors thereto.

Assume that two terminal devices each requiring four output terminals are needed in the embodiment. In this case, for example, those two terminal devices may be assigned with the addresses of "0100" and "0101", if the terminal device assigned with "0101" uses four output terminals among the five output terminals. Alternatively, for example, those two terminals may be assigned with the addresses of "0100" and "0010", if the signal lines of $a_1$ and $a_2$ inputted to the decoder 82 of the terminal device assigned with "0010" are exchanged.

Figure 5:
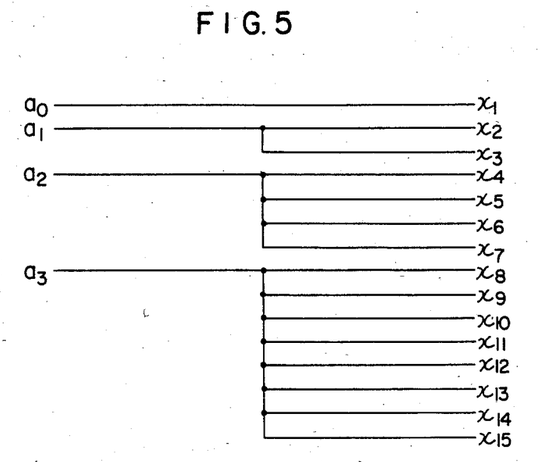
FIG. 5 shows a detailed circuit diagram of another embodiment of the decoder.
Figure 6:
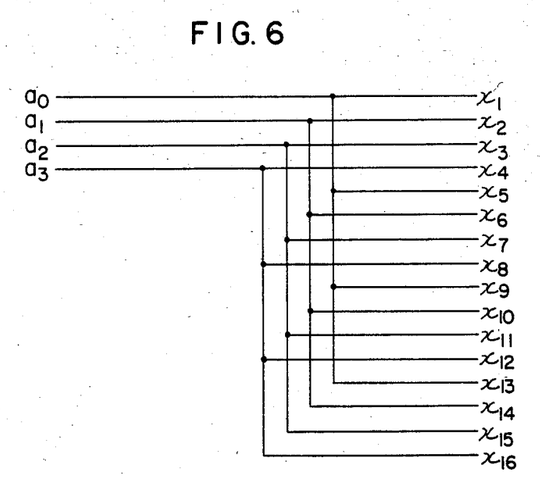
FIG. 6 shows a detailed circuit diagram of a further embodiment of the decoder.

FIGS. 5 and 6 show other embodiments of the address decoder 82. In FIG. 5, the addresses correspond to the number of output terminals like in FIG. 4 and the circuit is constructed only by wiring. In the embodiment of FIG. 6, a bit pattern of the address appears in a pattern of the input terminals and a pattern of the output terminals so that the input terminals and the output terminals can be readily distinguished and the circuit can be constructed only by wiring.

Figure 7:
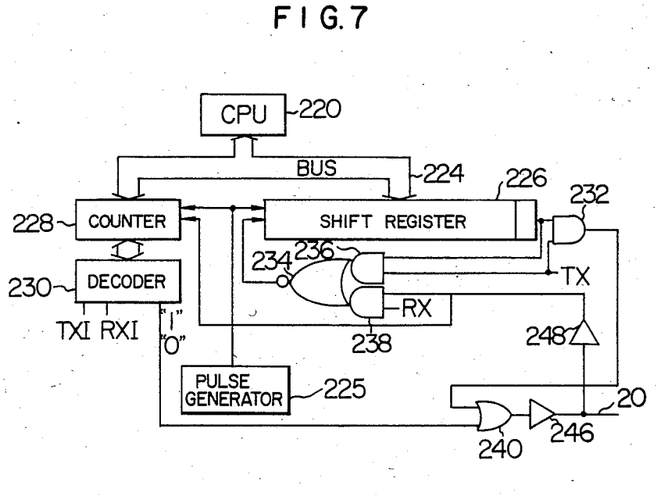
FIG. 7 shows a block diagram of a central processor.

FIG. 7 shows a detailed block diagram of the central processor 10. It basically comprises a digital computer 220 such as a microcomputer or a mini computer, a shift register 226, a counter 228 and a decoder 230. A pulse generator 225 supplies to the shift register 226 and the counter 228 clock pulses of the same frequency as that of the pulse generator 58 in FIG. 2. The counter 228 and the register 226 are connected to the computer 220 through a bus 224. The address data and the control data are set in the shift register 226 from the computer 220. Then, a predetermined count is set in the counter 228. The output of the counter 228 is set in the decoder 230 and a "0" signal is sent from the decoder 230 to the transmission line 20 through an OR gate 240 and a buffer 246. Then, a "1" signal is supplied from the decoder 230 through the OR gate 240 and the buffer 246. The timing when the output signals occur is controlled by the count of the counter 228 which counts the clock pulses from the pulse generator 225. When the signal TXI is produced, AND gates 236 and 232 are conditioned and the shift register 226 starts shifting. The data TX held in the shift register 226 is sent to the transmission line 20, one bit at a time in response to the clock pulses from the pulse generator 225, from the AND gate 232 through the OR gate 240 and the buffer 246. The data is also inverted, one bit at a time, through the AND gate 236 and a NOR gate 234 and the inverted data is fed back to the shift register 226. Thus, when the data TX held in the shift register 226 has been transmitted, the content held in the shift register 226 is changed to the inverted data $\overline{TX}$ and the inverted data is subsequently outputted. Then, the transmission of the information is terminated. When the continuous "0" signal is received from the transmission line 20, the counter 228 starts the reception operation and the signal RXI is outputted from the decoder 230. The signal RXI conditions the AND gate 238 so that the signal from the transmission line 20 is set in the shift register 226 as the inverted signal through the buffer 248, the AND gate 238 and the NOR gate 234. The first signal RX is inverted and the inverted signal $\overline{RX}$ is set, and when the signal $\overline{RX}$ is sent, the inversion of the signal $\overline{RX}$, that is, the signal RX is set in the shift register, one bit at a time and the signal $\overline{RX}$ held therein is sequentially shifted out, one bit at a time. Eventually, the signal RX is held in the shift register 226. This signal RX is read into the computer 220 through the bus 224. In the embodiment, the pulse generators 225 and 58 are provided independently in the central processor 10 and the terminal device 30, respectively. However, no problems would be encountered due to the frequency difference between the pulse generators since the transmission of an information unit can be completed within the time period of about 200 to 300 clock pulses of the pulse generators.

The basic block diagram of the embodiment of the present invention is shown in FIG. 1. The transmission line 20 may be an optical transmission line which uses optical transducers. FIG. 2 shows an embodiment of the terminal device. A primary object of the terminal device is to control the electric devices and read in the outputs of the detecting devices by transmitting and receiving the signals through the input/output terminals 101–115. It is, therefore, efficient to increase the number of the terminals 101–115 and reduce the number of the terminals of other purpose.

In the present embodiment, the data for setting the input/output functions is not supplied externally of the terminal device but it is determined based on the address data in the address setting circuit 70 as shown in FIG. 2, so that the number of terminals is reduced.

Since the signals are transmitted and received by the shift register 40, the circuit is simple. Since the shift register 40 is connected in a loop by the circuit including the AND gate AND2 and the NOR gate NOR1 having the inverting function, the signals TX and $\overline{TX}$ can be readily transmitted. Since the data is supplied from the transmission line 20 through the AND gate AND1 and the NOR gate NOR1 having the inverting function, the signals RX and $\overline{RX}$ can be readily received.

Since the whole circuit of the terminal device is constructed by the counter 52 and the decoder 54 which decodes the content of the counter 52, the control is simplified. In the embodiment of FIG. 2, the output terminals are selected in accordance with the address. Alternatively, the input terminals may be selected. In this case, the input buffers 84A–84O are controlled by the output of the decoder 82. In the present embodiment, the output buffers are controlled by the output of the decoder and the information for all of the terminals is supplied to the input/output circuit 60. Accordingly, the error or failure of the circuit can be detected as described above.

The input/output function setting data for the input/output terminals may be supplied to the decoder 82 from the computer. In this case the input/output function setting data supplied from the computer is set in a register, thence it is supplied to the decoder 82. When the information transmission system is installed in the automobile, it is readily expected that many noise sources are included and hence the data held in the register may be altered to appear as wrong data by the noises. Accordingly, the input/output function setting data may be inverted by the noise. This is very risky. In the present embodiment, the input/output functions are set by connecting the terminals either to the ground or to the power supply, the malfunction due to the noise is avoided. Specifically, the terminals AD1, AD2 and AD4 of the address setting circuit 70 are grounded and the terminal AD3 is connected to the 5-volts power supply. They may be connected through resistors, as required.

As described hereinabove, in the present embodiment, the input/output functions are set based on the address data assigned to the corresponding terminal device. Accordingly, an input terminal for externally supplying the input/output function setting data is not necessary and the number of terminals of the terminal devices is minimized and the terminal device is reduced in size. This is very important when the terminal device is implemented by the IC device, because the number of terminals significantly affects to the easiness of the manufacture of the IC device, the size and the cost. In addition, to compare with a method in which the input/output function setting data is held in the register as is done in the microcomputer system, the input/output function setting circuit of the present invention is constructed by the simple logic circuit or the handwired circuit and hence it is very stable and has no risk that the input/output function is inverted by the noise. This is very advantageous when the terminal device is used in a severe condition inherent to the automobile, for example, many noises such as ignition noises.

As described hereinabove, according to the present invention, even if the type of the terminal devices used in the automobile central wiring system is limitted to one, the input/output terminals can be effectively used with minimum loss.

What is claimed is:

1. An information transmission system comprising:
an addressable terminal device including a plurality of input/output terminals for inputting and outputting signals;
a central processor for receiving data from said terminal device and for supplying data including address information to said terminal device; and
a transmission line connected between said central processor and said terminal device;
said terminal device including address setting means which is selectively settable for generating signals representing an address for said terminal device, holding means for holding data including address information received from said central processor or data received from said input/output terminals, comparator means for comparing received address information in said holding means with said generated address signals to determine if said data received from said central processor is to be applied from said holding means to said input/output terminals, and connection means responsive to said comparator means for applying said received data from said holding means to selected ones of said input/output terminals designated on the basis of said generated address signals.

2. An information transmission system according to claim 1, wherein said connection means includes a plurality of buffer circuits connecting said holding means to respective input/output terminals, and selection means responsive to said generated address signals for enabling selected ones of said buffer circuits.

3. An information transmission system according to claim 2, wherein said selection means comprises means for enabling a number of buffer circuits equal to the number designated by the address represented by said generated address signals.

4. An information transmission system according to claim 3, wherein said selection means includes a logical circuit connected to receive said generated address signals as input signals and providing output signals to said plurality of buffer circuits to enable selected ones of said buffer circuits.

5. An information transmission system according to claim 3, wherein said selection means includes a circuit formed by a plurality of wired-OR connections of said generated address signals to produce output signals to enable selected ones of said buffer circuits.

6. An information transmission system according to claim 2, wherein said holding means includes a shift register connected to said transmission line to receive said data and address information from said central processor and to transmit data from said input/output terminals to said central processor, and an input/output circuit connected to said shift register for receiving signals from respective input/output terminals to be applied as data to said shift register and for holding data received from said shift register to be applied as individual signals to selected input/output terminals, said input/output circuit being connected to said input/output terminals via said plurality of buffer circuits.

7. An information transmission system according to claim 6, wherein said plurality of buffer circuits includes an input buffer and an output buffer connected between each respective output of said input/output circuit and a respective one of said input/output terminals, said output buffers being connected to said selection means so as to be enabled in accordance with said generated address signals.

8. An information transmission system according to claim 7, wherein said input buffers are permanently enabled so that signals applied to said selected input/output terminals via enabled output buffers are also fed back to said input/output circuit via input buffers to cause the signals stored in said input/output circuits to correspond to said fed back signals.

9. An addressable terminal device for effecting communication between a central processor and a plurality of input/output devices, comprising:
a plurality of input/output terminals for inputting and outputting signals;
address setting means including address setting means which is selectively settable for generating signals representing an address for said terminal device;
holding means for holding data including address information received from said central processor or data received from said input/output terminals, coImparator means for comparing received address information in said holding means with said generated address signals to determine if said data received from said central processor is to be applied from said holding means to said input/output terminals, and connection means responsive to said comparator means for applying said received data from said holding means to selected ones of said input/output terminals designated on the basis of said generated address signals.

10. An addressable terminal device according to claim 9, wherein said connection means includes a plurality of buffer circuits connecting said holding means to respective input/output terminals, and selection means responsive to said generated address signals for enabling selected ones of said buffer circuits.

11. An addressable terminal device according to claim 10, wherein said selection means comprises means for enabling a number of buffer circuits equal to the number designated by the address represented by said generated address signals.

12. An addressable terminal device according to claim 11, wherein said selection means includes a logical circuit connected to receive said generated address signals as input signals and providing output signals to said plurality of buffer circuits to enable selected ones of said buffer circuits.

13. An addressable terminal device according to claim 11, wherein said selection means includes a circuit fromed by a plurality of wired-OR connections of said generated address signals to produce output signals to enable selected ones of said buffer circuits.

14. An addressable terminal device according to claim 10, wherein said holding means includes a shift register connected to said transmission line to receive said data and address information from said central processor and to transmit data from said input/output terminals to said central processor, and an input/output circuit connected to said shift register for receiving signals from respective input/output terminals to be applied as data to said shift register and for holding data received from said shift register to be applied as individual signals to selected input/output terminals, said input/output circuit being connected to said input/output terminals via said plurality of buffer circuits.

15. An addressable terminal device according to claim 14, wherein said plurality of buffer circuits includes an input buffer and an output buffer connected between a respective output of said input/output circuit and a respective one of said input/output terminals, said output buffers being connected to said selection means so as to be enabled in accordance with said generated address signals.

16. An addressable terminal device according to claim 15, wherein said input buffers are permanently enabled so that signals applied to said selected input/output terminals via enabled output buffers are also fed back to said input/output circuit via input buffers to cause the signals stored in said input/output circuits to correspond to said fed back signals.

17. An information transmission system comprising:
an addressable terminal device including a plurality of input/output terminals for inputting and outputting signals;
a central processor for receiving data from said terminal device and for supplying data including address information to said terminal device; and
a transmission line connected between said central processor and said terminal device;
said terminal device including address setting means which is selectively settable for generating signals representing an address for said terminal device and an input/output selection circuit connected to said address setting means for selecting the input/output functions of said input/output terminals on the basis of said address signals, wherein said terminal device includes a holding circuit for holding data, and buffer circuits connected between said input/output terminals and said holding circuit, said buffer circuits being selectively enabled in accordance with said address signals.

18. An information transmission system according to claim 17 wherein said input/output selection circuit includes a decoder connected to receive said address signals, whereby said buffer circuits are controlled by the output of said decoder.

19. An information transmission system according to claim 18 wherein said terminal device includes a shift register for receiving data including address information from said central processor and a comparator for extracting said address information from said shift register and for comparing the extracted address information with said address signals.

* * * * *